Sept. 17, 1968　　　　J. E. GANTT　　　　3,402,212
DEHYDROGENATION OF ETHYLBENZENE TO STYRENE
Filed July 18, 1966
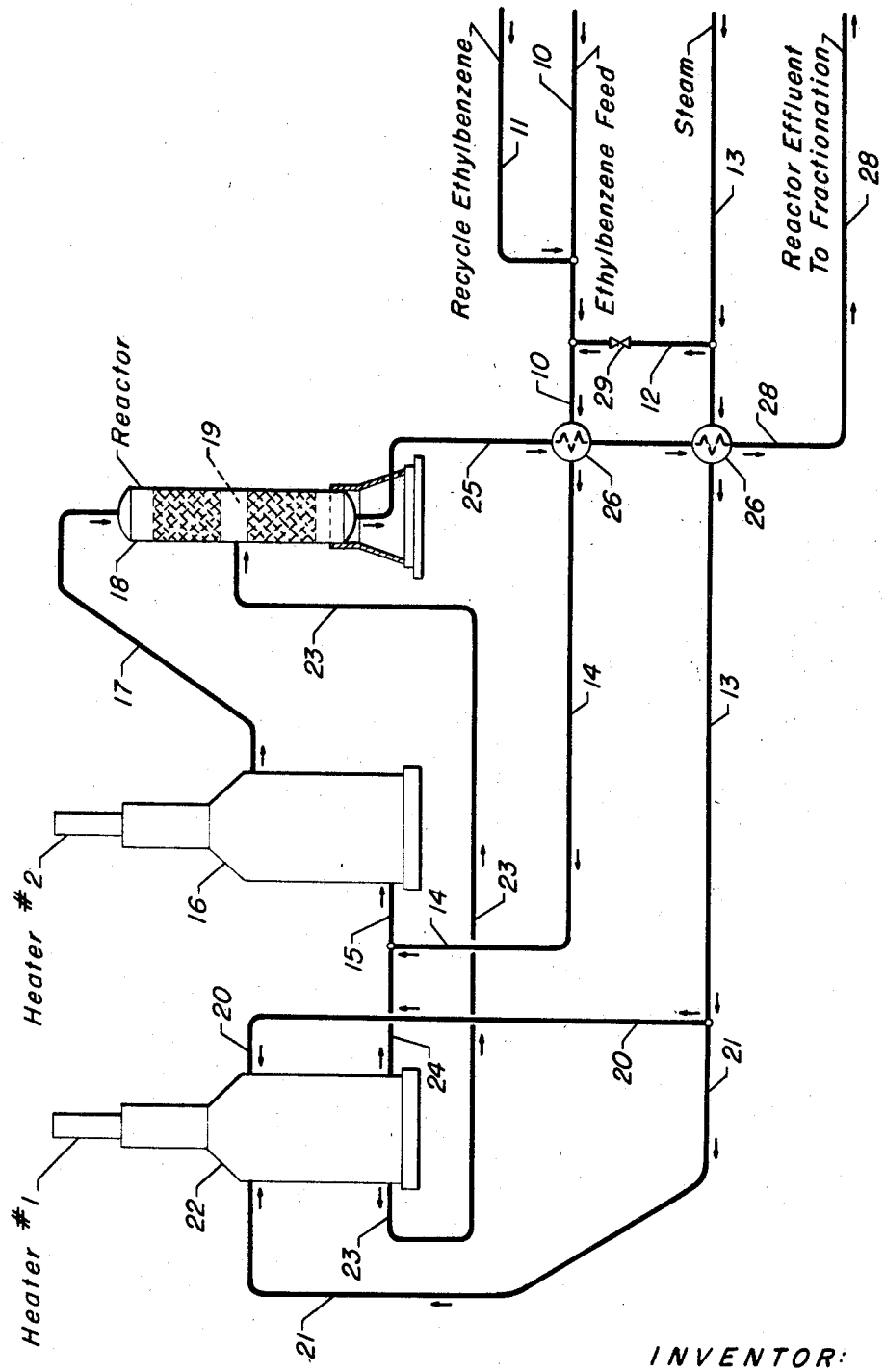
INVENTOR:
James E. Gantt
BY:
*James P. Hoatson Jr.*
*Joseph E. Mason Jr.*
ATTORNEYS United States Patent Office 3,402,212
Patented Sept. 17, 1968

3,402,212
DEHYDROGENATION OF ETHYLBENZENE
TO STYRENE
James E. Gantt, Elmwood Park, Ill., assignor to Universal Oil Products Company, Des Plaines, Ill., a corporation of Delaware
Filed July 18, 1966, Ser. No. 565,878
6 Claims. (Cl. 260—669)

This invention relates to an improved method and apparatus for the dehydrogenation of ethylbenzene to styrene. More specifically, this invention relates to a more economic catalytic method for obtaining increased yields of styrene through the steam dehydrogenation of ethylbenzene. It particularly relates to an improved method for achieving economical thermal balance in the overall steam dehydrogenation of ethylbenzene using a multi-bed catalytic reactor.

Basic methods are well-known in the art for the production of styrene from ethylbenzene. However, the prior art methods have achieved generally poor conversions of ethylbenzene to styrene per pass through the catalytic system. Typically, the prior art processes achieve a conversion of about 30% to 40%. The recovery of styrene in high concentration from such a process requires extensive distillation apparatus in order to separate the styrene from the unreacted ethylbenzene and other reaction products. Usually the ethylbenzene is recycled in large quantities, thereby, also necessitating increased sizing of reactor vessels. In short, when the conversion of ethylbenzene to styrene is only in the 30% range, it is extremely difficult to economically produce styrene in high concentration and high purity.

Those skilled in the art recognize the importance of being able to economically produce styrene since this chemical, otherwise called phenylethylene, is extensively employed throughout commerce as the raw material in the production of resins, plastics and elastomers. Specifically, styrene is copolymerized with butadiene to produce a high molecular weight synthetic rubber. Although styrene may be recovered in limited quantities from various coal tars and heavy crude oils, it is preferred to synthesize large quantities by the dehydrogenation of ethylbenzene. The raw material, ethylbenzene, can either be separated from petroleum fractions by super-distillation, or can be prepared through the alkylation of benzene with ethylene.

The prior art methods for producing styrene are generally carried out by passing a mixture of ethyblenzene and steam over a fixed bed of dehydrogenation catalyst. In order to heat the reactants to reaction temperature, it is also general practice to admix the ethylbenzene, which is at a temperature significantly below reaction temperature, with steam which has been super-heated to a temperature above the reaction temperature so that the mixture is at reaction temperature as it passes over the dehydrogenation catalyst. Since the basic chemical reaction involved, namely the dehydrogenation of ethylbenzene to styrene, is endothermic, there is a significant decrease in the reaction zone temperature as the reaction proceeds. It is not unusual in these prior art processes to witness a drop of perhaps 50° C. to 100° C. within the reaction zone. Naturally, as the temperature decreases, the rapidity of the reaction also decreases so that the overall efficiency of the process declines to a point where it would be economically unattractive unless processing means were found to overcome this disadvantage.

Again the prior art attempted to solve this problem by drastically increasing the temperature of the super-heated steam so that the difference between the inlet temperature of the reactants and the outlet temperature of the reaction products averaged generally the required reaction temperature. However, it was noted that at the instant the super-heated steam is admixed with the ethylbenzene, the ethylbenzene undergoes decomposition or cracking through the pyrolytic reaction. In many instances, such pyrolysis is effected to such a degree that the process becomes uneconomical due to the loss of ethylbenzene to carbon monoxide, carbon dioxide, polymeric materials, tars, etc. Another disadvantage is involved with the utility costs in raising the temperature of large quantities of steam to a level far above that required for effecting the dehydrogenation of the ethylbenzene. Additionally, in spite of all these efforts to control the reaction, the conversion of ethylbenzene to styrene remains at approximately the 30% to 40% level.

More recently, the prior art has suggested means for increasing the level of conversion by utilizing various schemes for admixing the ethylbenzene and steam in such a way as to avoid the pyrolytic reaction. One of the prior art methods has been to split the steam into several portions whereby additional steam is added between catalytic zones in order to reheat the reactants to reaction temperature. In these latter processes, conversions as high as 50% for ethylbenzene to styrene are alleged. However, these latter process schemes do not indicate the method by which the steam and ethylbenzene are heated with the result that utility costs are still prohibitively high for the achievement of the increased conversion level.

Accordingly, it is an object of this invention to effect a more economic method of dehydrogenating ethylbenzene to produce styrene in high concentration. It is another object of this invention to provide a method for the dehydrogenation of ethylbenzene to styrene characterized by a high conversion per pass of ethylbenzene to styrene. It is a specific object of this invention to provide an improved method for heating the reactants to reaction temperature in a more economic and facile manner than has heretofore been possible.

In accordance with the method of the present invention, styrene in high concentration is produced by the dehydrogenation of ethylbenzene in a fixed multi-bed catalytic reactor wherein the steam required for the reaction is added thereto in a novel split flow fashion. The inventive concept employed in the present invention embodies the novel manner in which the steam and hydrocarbons are not only heated to reaction temperature, but are maintained thereat in such a fashion that the steam requirements for the reaction are exceedingly low. By the practice of the present invention, conversions of ethylbenzene to styrene per pass exceed 50% by weight and require no more than 5 pounds of steam per pound of styrene produced.

In one embodiment of the present invention, a method for producing styrene in high concentration via the catalytic dehydrogenation of ethylbenzene in a multi-bed reactor vessel comprises admixing ethylbenzene with water in an amount equivalent to a first minor portion of hereinafter specified total steam; heating the ethylbenzene admixture to a temperature from 900° F. to 1100° F., limited, however, by a condition that the temperature must be at least 150° F. less than the hereinafter specified reactor inlet temperature, with the heating being accomplished by indirect heat exchange of the admixture with the reaction effluent; separately heating a second minor portion of the total steam required to a temperature from 900° F. to 1100° F., limited, however, on the condition that the steam temperature must be from 100° F. to 50° F. less than the reactor inlet temperature; blending this second portion of steam at its elevated temperature with the heated ethylbenzene admixture to form a total feed stream; heating the total feed stream to a temperature from 1100° F. to 1400° F., which is the specified reactor inlet temperature; contacting the heated feed stream with dehydrogenation catalyst contained in a first bed of the reactor vessel under conditions sufficient to convert at least 30% by weight of the ethylbenzene therein to styrene; heating at least a third minor portion of the total steam required from a temperature 1200° F. to 1500° F. with this temperature being at least 100° F. more than the specified reactor inlet temperature; admixing this heated third portion of steam with the total effluent from the first catalyst bed to form a second feed mixture in an amount such that the second feed mixture is at a temperature substantially the same as the specified reactor inlet temperature; contacting the second feed mixture with dehydrogenation catalyst in a second bed contained in the reactor vessel under conditions sufficient to convert at least 15% by weight of the ethylbenzene present therein to styrene; withdrawing the total reactor product stream from the reactor vessel into indirect heat exchange with the ethylbenzene feed admixture as hereinabove specified, such that the reactor product stream now contains from 2 to 10 pounds of steam per pound of ethylbenzene as the total steam specified, but in no event exceeding 5 pounds of steam per pound of styrene in the product; and, recovering styrene in high concentration from the heat exchanged reactor product.

Therefore, it can be seen from the above embodiment that the present invention relates to a catalytic process for effecting the steam dehydrogenation of ethylbenzene by a unique processing scheme whereby the temperature for reaction and the temperature of the principal streams (ethylbenzene and steam, and the mixture of ethylbenzene and steam) are carefully controlled with respect to each other. The advantages of the inventive method will be more clearly understood with reference to the attached drawing which is a schematic representation of the process flow illustrative of the inventive method.

With reference now to the attached drawing, the ethylbenzene enters the process through line 10, being admixed with recycle ethylbenzene in line 11, the source of which is hereinafter described. Typically, the total ethylbenzene stream is at a temperature of about 100° F. Furthermore, since the recycle ethylbenzene in line 11 may contain minor quantities of styrene, it is preferred to vaporize the ethylbenzene in order to inhibit the formation of styrene polymers while raising the temperature of the ethylbenzene charge. To accomplish the vaporization, the ethylbenzene in line 14 is admixed with water, usually in the form of steam, in an amount from about 5% to about 15% by weight of the total amount of steam utilized in the overall process and, generally, entering through line 13. If steam is used for the initial vaporization, it is admixed with the ethylbenzene charge through line 12 and valve 29. However, it is distinctly preferred in the practice of this invention to admix liquid water (source not shown) with the ethylbenzene charge in an amount equivalent to the above-specified amounts of steam. It has been discovered that if liquid water is used in place of steam for the initial admixing step, a significant reduction in the total quantity of steam required by the process will result. The admixture of ethylbenzene and water is passed into exchanger 26 whereby its temperature is raised within the range of 900° F. to 1100° F. by the exchange of heat with the reactor product stream in line 25. Typically, the temperature of the admixture in line 14 is 985° F. and sufficient water has been added to produce 0.72 pound of steam per pound of ethylbenzene at this point.

Generally, the total amount of steam required for the inventive process enters through line 13 and, if desired, can be preheated by further exchange with the reactor product stream in exchanger 27. However, if liquid water has been used to generate steam in exchanger 26, exchanger 27 is preferably deleted from the process scheme. A second minor portion of the total steam, e.g. 1.11 pounds steam per pound of ethylbenzene, is diverted from line 13 into line 20 whereby it passes into heater 22 and is heated to a temperature from 900° F. to 1100° F. The heated second portion of steam is withdrawn from heater 22 through line 24, typically at a temperature of about 1060° F., and admixed with the ethylbenzene-steam feed mixture in line 15 to thereby form a total feed stream at a temperature of, say, 1020° F. This total feed stream, now containing about 1.83 pounds of steam per pound of ethylbenzene, is heated in heater 16 to the reactor inlet temperature which is from 1100° F. to 1400° F., typically, 1150° F. The heated feed stream passes from heater 16 through line 17 into the first catalyst bed of multi-bed reactor vessel 18 wherein it is contacted with dehydrogenation catalyst under conditions sufficient to convert at least 30% by weight of the ethylbenzene contained therein to styrene.

The catalyst employed for the dehydrogenation reaction is preferably an alkali-promoted iron catalyst. Typically, such a catalyst may consist of 85% by weight ferrous oxide, 2% by weight of chromia, 12% by weight of potassium hydroxide, and 1% by weight of sodium hydroxide. Other catalyst compositions include 90% by weight iron oxide, 4% by weight chromia, and 6% by weight potassium carbonate. While these known commercial dehydrogenation catalysts are preferred, other known catalysts may be used, including those comprising ferrous oxide-potassium oxide, other metal oxides and/or sulfides, including those of calcium, lithium, strontium, magnesium, beryllium, zirconium, tungsten, molybdenum, titanium, hafnium, vanadium, aluminum, chromium, copper, and mixtures of two or more including chromia-alumina, alumina-titania, alumina-vanadia, etc. Similarly, the various methods of preparing the aforesaid catalyst are well known within the prior art.

The conditions in the first catalyst bed, sufficient to achieve the aforesaid conversion of ethylbenzene to styrene, include not only the catalyst as described and the temperatures specified, but also include the weight hourly space velocity. The space velocity as used herein is defined as pounds of ethylbenzene charged per hour per pound of catalyst disposed within reactor 18. Typically, the weight hourly space velocity is within the range of about 0.1 to 1.0, and preferably within the range of about 0.2 to about 0.7. The space velocity at any given time is correlated with the selected inlet temperature to result in a reactor product effluent having a temperature within the range of about 1000° F. to 1400° F., typically 1065° F.

The amount of catalyst contained in each catalyst bed may be varied considerably. Usually, the amount of catalyst is expressed in terms of bed depth which may range from 6 inches to 50–60 feet, depending upon such conditions as alkylated aromatic hydrocarbon feed rate and the amount of heat which therefore must be added to effectuate the reaction at an economical rate. Typically, the bed depth may range from 2 feet to 6 feet.

The reactor pressure may also be varied over a considerable range. Preferably, atmospheric pressure is used although, in some cases, subatmospheric or superatmospheric pressure may be desirable. Sufficient pressure must be maintained at the reactor inlet to overcome the pressure drop through the multi-beds of catalyst contained in the reactor vessels or in separate vessels if each such bed is contained in a separate reactor. Either multiple beds contained in a single reactor, or single beds in multiple reactors, or a mixture of these arrangements, may be used in the practice of this invention.

As the reactants in line 17 contact the catalyst contained in the first catalyst bed in reactor 18, there is a temperature decrease observed across the catalyst bed due to the endothermic nature of the reaction. Without additional heat being required, the temperature in space 19 of the effluent leaving the first catalyst bed would be in the order of 50° C. to 100° C. or more less than the inlet temperature selected for the material in line 17. Therefore, a third portion of the total steam is passed via line 21 into heater 22 in order to increase its temperature within the range of 1200° F. to 1500° F., being conditioned, however, on the fact that the temperature selected must be at least 100° more than the reaction zone inlet temperatures. In the instant case, this third portion of steam leaves heater 22 via line 23 at a temperature of, said 1440° F., and is in an amount equivalent to one pound of steam per pound of ethylbenzene in the feed mixture. The third portion of steam is passed via 23 into the space 19 between the two catalyst beds shown in the attached drawing, wherein it is mixed by suitable distributing and mixing means, not shown, with the total effluent leaving the first catalyst bed.

The admixture formed in void space 19 creates a second feed mixture which is at a temperature substantially the same as the reactor inlet temperature specified hereinabove. The heated second feed mixture is then contacted with the preferred dehydrogenation catalyst in a second bed contained in reactor 18 under conditions sufficient to convert at least 15% by weight of the ethylbenzene present therein to styrene.

The total reaction zone product is withdrawn from reactor 18 via line 25 and passed in indirect heat exchange with the ethylbenzene feed admixture in exchanger 26 as hereinabove specified. It is to be noted that the product stream in line 25 now contains from 2 to 10 pounds of steam per pound of ethylbenzene in the feed admixture, typically 2.8 pounds per pound. On an equivalent basis, the steam corresponds to approximately 4.1 pounds of steam per pound of styrene produced with the typical conversion being in excess of 45%, for example, in the range of 60%.

For the case where steam is used entirely in the process (in lieu of the liquid water as hereinabove discussed) the reactor effluent in line 25 leaves exchanger 26 and passes into exchanger 27 wherein it exchanges heat with the steam coming into the process via line 13. The product effluent leaving exchanger 27 through line 28 is usually at a temperature of not less than 500° F., although in some cases it may be as low as 300° F., prior to passing into further processing equipment whereby styrene is recovered in high concentration. The unreacted ethylbenzene is also recovered and recycled to the process through line 11 as specified.

Essential features of the process of the present invention employed effect a significant economical advantage with regard to utility and operating cost. Optimum advantage may be taken with the steam requirements for the process being proportioned in the following manner (refer to the above description regarding the accompanying drawing) with the total steam not exceeding 3 pounds of steam per pound of ethylbenzene:

first portion of steam should be from 0.65 to 1.0 pound per pound;
second portion of steam should be from 1.0 to 1.2 pounds per pound; and
the third portion of steam should be from 0.80 to 1.35 pounds per pound;

with the other reaction conditions being selected such that the total product effluent stream contains from 4 to 6 pounds of steam per pound of styrene in the effluent stream.

The invention claimed:
1. Method for producing styrene in high concentration via the catalytic dehydrogenation of ethylbenzene in a multi-bed reaction zone which comprises
  (a) admixing ethylbenzene with water in an amount equivalent to a first minor portion of hereinafter specified total steam;
  (b) heating said admixture to a temperature from 900° F. to 1100° F., but at least 150° F. less than the hereinafter specified reaction zone inlet temperature by indirect heat exchange of the admixture with the reaction zone effluent;
  (c) separately heating a second minor portion of said total steam to a temperature from 900° F. to 1100° F., but from 100° to 50° F. less than said reaction zone inlet temperature;
  (d) blending said second portion of steam with said heated admixture to form a total feed stream;
  (e) heating the feed stream to a temperature from 1100° F. to 1400° F. as the specified reaction zone inlet temperature;
  (f) contacting the heated feed stream with dehydrogenation catalyst contained in a first bed of said reaction zone under conditions sufficient to convert at least 30% by weight of the ethylbenzene therein to styrene;
  (g) heating at least a third minor portion of said total steam to a temperature from 1200° F. to 1500° F., said temperature being at least 100° F. more than said reaction zone inlet temperature;
  (h) admixing said heated third portion of steam with the total effluent from the first catalyst bed to form a second feed mixture in an amount such that the second feed mixture is at a temperature substantially the same as said reaction zone inlet temperature;
  (i) contacting the second feed mixture with dehydrogenation catalyst in a second bed of said reaction zone under conditions sufficient to convert at least 15% by weight of the ethylbenzene present therein to styrene;
  (j) withdrawing the total reaction zone product stream from the zone into indirect heat exchange with said ethylbenzene admixture as hereinabove specified, said product stream now containing from 2 to 10 pounds of steam per pound of ethylbenzene in said admixture as the total steam specified, but not exceeding 5 pounds of steam per pound of styrene in said product stream; and
  (k) recovering styrene in high concentration from the heat exchanged reaction zone product.

2. Method according to claim 1 wherein said total steam does not exceed 3 pounds of steam per pound of ethylbenzene and said
  first portion is from 0.65 to 1.00 pound per pound,
  second portion is from 1.00 to 1.20 pounds per pound,
  third portion is from 0.80 to 1.35 pounds per pound, and
said product stream contains from 4 to 6 pounds of steam per pound of styrene in said product stream.

3. Method according to claim 1 wherein said water is liquid water.
4. Method according to claim 2 wherein said water is liquid water.
5. Method according to claim 1 wherein said water is heated water vapor.
6. Method according to claim 4 wherein said total conversion of ethylbenzene to styrene is at least 60% by weight per pass and said total steam required does not exceed 5 pounds of steam per pound of styrene produced.

References Cited
UNITED STATES PATENTS

| | | | |
|---|---|---|---|
| 2,831,907 | 4/1958 | Mayfield et al. | 260—669 |
| 2,851,502 | 9/1958 | Bowman et al. | 260—669 |
| 3,118,006 | 1/1964 | Lovett et al. | 260—699 |

DELBERT E. GANTZ, *Primary Examiner.*
C. R. DAVIS, *Assistant Examiner.*